United States Patent [19]
Kim et al.

[11] Patent Number: 5,801,503
[45] Date of Patent: Sep. 1, 1998

[54] TEMPERATURE-COMPENSATING OVERCURRENT DETECTION CIRCUIT FOR DC MOTOR

[75] Inventors: Yong-Ho Kim, Seoul; Hyun-Min Jo, Kyungki-do, both of Rep. of Korea

[73] Assignee: Samsung Electronics Co., Ltd., Suwon, Rep. of Korea

[21] Appl. No.: 674,871

[22] Filed: Jul. 2, 1996

[30] Foreign Application Priority Data

Jul. 3, 1995 [KR] Rep. of Korea ............... 1995 19296

[51] Int. Cl.⁶ .................................................. H02H 7/085
[52] U.S. Cl. .......................... 318/434; 318/471; 388/903; 361/24
[58] Field of Search ................................ 318/434, 471; 361/23, 24, 25, 31; 388/902, 903, 909, 934

[56] References Cited

U.S. PATENT DOCUMENTS 3,942,074  3/1976  Graham .
4,381,480  4/1983  Hara et al. .

Primary Examiner—Bentsu Ro
Attorney, Agent, or Firm—Jones & Volentine, L.L.P.

[57] ABSTRACT

A temperature-compensating overcurrent detection circuit for a DC motor comprising a converter, an integrator and an overcurrent detector. The present invention provides for an overcurrent detection circuit for a DC motor that is adapted compensate for operating temperature of the motor's environment and such compensating detection circuit does not respond with an early forcible operation when the mechanical device is constrained. The overcurrent detection circuit is adapted to permit the motor to carry out its intended operation exactly without having malfunctions due to noise and a temporary overcurrent.

13 Claims, 7 Drawing Sheets

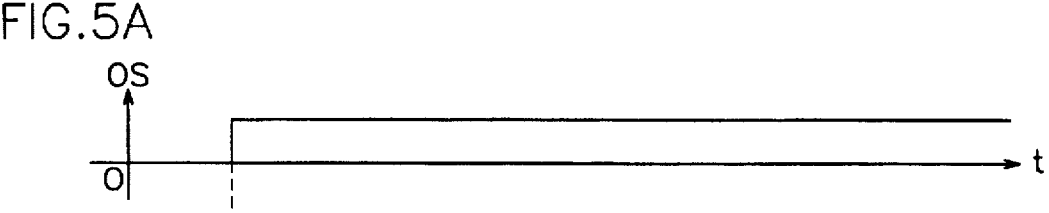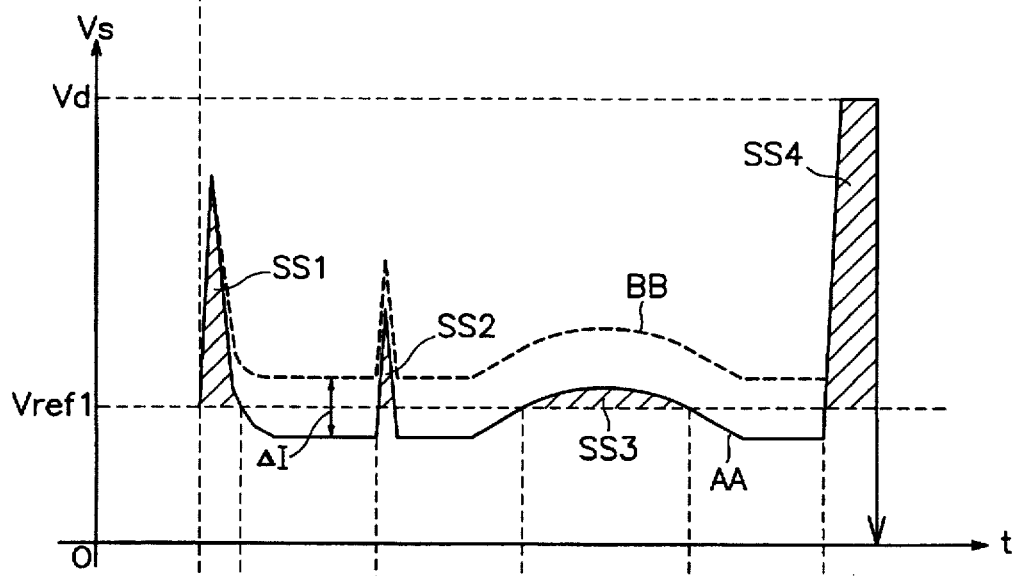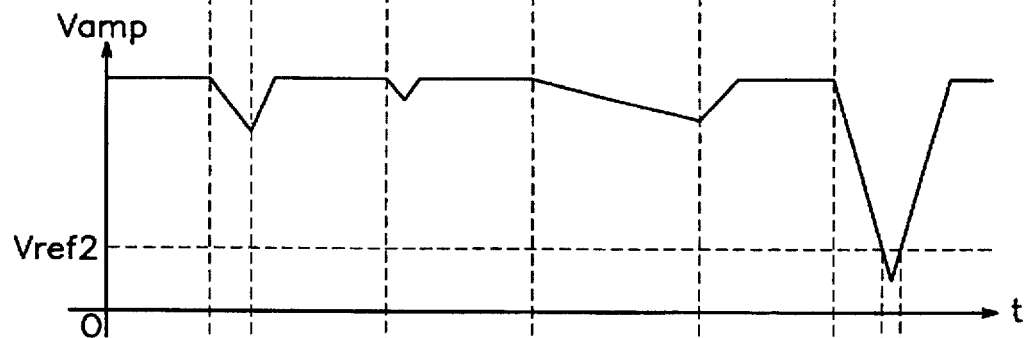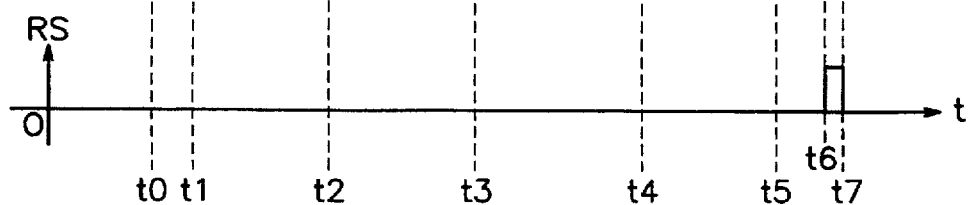

TEMPERATURE-COMPENSATING OVERCURRENT DETECTION CIRCUIT FOR DC MOTOR

BACKGROUND OF THE INVENTION

A. Field of the Invention

The present invention relates to a temperature-compensating overcurrent detection circuit for a DC motor.

More particularly, the present invention relates to a temperature-compensating overcurrent detection circuit for a DC motor which does not respond with an early forcible operation when it is initially constrained by a mechanical device (e.g., when a mechanical brake or stalling mechanical load is applied). The DC motor can continue to carry out its operation exactly as it was doing before the load without malfunctions due to noise and temporary overcurrent while using a capacitor of small capacitance. It is adapted to cope with the large overcurrent due to the actual constraint of a motor at a rapid speed by exactly distinguishing such from the temporary overcurrent (load) due to its initial start-up. It is capable of distinguishing both the temporary overcurrent produced while a DC motor is being operated and the weak overcurrent due to an increase in the amount of mechanical friction from the overcurrent produced by the actual constraint of the motor regardless of operation temperature of the DC motor by detecting the overcurrent flowing in the DC motor.

B. Description of the Prior Art

FIG. 3 is a current waveform chart illustrating the current levels during the operation of a conventional DC motor.

Generally, the amounts of current necessary to drive a motor varies at different operational stages of the motor as illustrated in FIG. 3. When the motor is first operated ("initial start-up" or "initial load"), the current amount is usually adapted to increase for a predetermined period A to permit acceleration of the motor. The level of current flowing to the motor then returns to the level necessary for a normal operation state and the motor is driven thus. Such current level continues flowing at the predetermined amount of current flows until the motor is being mechanically constrained (interval B in FIG. 3, e.g. at a "steady-state load").

When the motor is mechanically constrained (e.g. a brake or heavy mechanical load is applied to the motor), the amount of current required is increased because the motor is not able to operate (current "surges") while the power (current) continues to be applied. This produces excess heat; and the increased current amounts due to the constraint may even break down the motor.

As described above, when the DC motor is operated using a mechanical relay or a semiconductor power element, it is necessary to concurrently stop supplying the power while the mechanical constraint is applied. Such is necessary to prevent the DC motor from being damaged by power surges related to application of the mechanical constraint.

In general, the way that this problem has been handled in the past is by detecting the overcurrent flowing in the DC motor when the motor is constrained as above, and by turning off the relay or semiconductor power element upon detection of such conditions.

It is preferable that an overcurrent protector is adapted to not react to the overcurrent produced at the early operational stages of a motor (initial startup and initial acceleration). It is also preferred that the protector would be adapted to not react to the overcurrent produced by an overcharge due to the motor being locked in place by a mechanical device.

Conventionally, the overcurrent is not detected (the detector is turned off) for a period of time beginning with the initial startup of the motor through the period when its operation returns to normal operation. For example, the detector is not applied during the transitional period from startup to from 0.2 to 0.4 sec. to prevent malfunction due to the overcurrent produced at the early operation.

However, the conventional method has a disadvantage in that it is difficult to accurately restrict detection during such a period. The circuit for excluding the overcurrent detection during such a time period is complex. Also, during the early transitional period the circuit may be forcibly operated even when the circuit is intended to be restricted during such an early transitional period.

As a conventional method, there is a procedure which can simply solve the overcurrent at the early stage by using a low-pass filter (LPF). However, this method also has a disadvantage in that it uses a capacitor with a large capacitance. Malfunctions often occur even at a current value within the range of an LPF element and is a little greater than a reference current value to detect when lubricating oil is not sufficient in the mechanical device or the operation temperature is too low. Further a response speed is slow when the mechanical device is actually restricted.

A conventional circuit for solving the above-mentioned disadvantages and for protecting the motor from the overcurrent is illustrated in FIG. 1.

Hereinafter, a conventional overcurrent detection circuit for a DC motor is explained with reference to the accompanying drawings.

FIG. 1 is a circuit diagram illustrating a conventional overcurrent detection circuit for a DC motor.

FIGS. 2A to 2D are waveform charts illustrating current levels at different nodes in FIG. 1. FIG. 2A is a waveform chart of a starting signal inputted at the early stage, FIG. 2B is a waveform chart of motor voltage and the first reference voltage, FIG. 2C is a waveform chart of an integrated voltage and the second reference voltage, and FIG. 2D is a waveform chart of a reset signal.

Referring to FIG. 1, the conventional overcurrent detection circuit for a DC motor includes a micro-controller 10 for receiving signals from a signal input terminal I for driving a motor and a reset terminal R for receiving a reset signal, and producing a signal for controlling the motor through a signal output terminal O; a motor driver 20 operated according to a signal produced from the micro-controller 10 via a means for producing a signal for driving the motor; a motor M connected to an output terminal of the motor driver 20 which is driven according to a signal inputted from the motor driver 20; a converter 30 for converting a current signal flowing in the motor M into a corresponding voltage signal; an integrator 40 for comparing a signal inputted from the converter 30 with the reference voltage, detecting overcurrent and integrating the detected value; and an overcurrent detector 50 for comparing a signal inputted from the integrator 40 with the reference voltage, determining that overcurrent flows when the signal inputted from the integrator 40 is greater than the reference voltage, and producing a corresponding signal.

The motor driver 20 includes a transistor Q2 with a base terminal connected to an output terminal O of the micro-controller 10 and with an emitter terminal grounded, and a relay RY with one terminal whereto a power $V_{DC}$ is inputted through a signal input terminal connected to a collector terminal of the transistor Q2.

The relay RY includes an electromagnet EM2 with a first terminal whereto a power $V_{DC}$ is connected and having a second terminal which is connected to the collector terminal of the transistor Q2, and a switch S2 with a first terminal connected to a first terminal of the electromagnet EM2 and a second terminal which is connected to a first terminal of the motor M.

The converter 30 includes a resistor Rs with a first terminal connected to the second terminal of the motor M and with a second terminal which is grounded.

The integrator 40 includes an input resistor Rin with a first terminal connected to the motor voltage Vs; a first operational amplifier OP4 with an inverting input terminal connected to the second terminal of the input resistor Rin and with a non-inverting input terminal whereto a first reference voltage Vref1 is inputted; and a capacitor Cin with a first terminal connected to the second terminal of the input resistor Rin and with a second terminal which is connected to an output terminal of the first operational amplifier OP4.

The overcurrent detector 50 includes a second operational amplifier OP5 with an inverting input terminal whereto an output signal of the first operational amplifier OP4 in the integrator 40 and a non-inverting input terminal whereto a second reference voltage Vref2 is inputted, and the output signal thereof is inputted to a reset terminal of the micro-controller 10.

The operation of the conventional overcurrent detection circuit for a DC motor may be explained as follows.

When a driving signal OS as illustrated in FIG. 2A is inputted to a signal input terminal I in the micro-controller 10, the micro-controller 10 outputs a signal to the motor driver 20, thereby turning ON the transistor Q2. Accordingly, the relay RY is turned ON, the switch S2 is closed, the motor driving power $V_{DC}$ is supplied to the motor M, and the motor M is driven.

Motor current $I_M$ flows when the motor M is driven, motor voltage Vs in the second terminal of the motor M is generated through the resistor Rs in the converter 30 as illustrated in FIG. 2B.

The integrator 40 receives the motor voltage Vs through the input resistor Rin continuing into the inverting input terminal.

Here, since the value of the input resistor Rin is much greater than that of the resistor Rs, it does not influence the signal value of the motor voltage Vs.

The first operational amplifier OP4 in the signal integrator 40 compares the inputted signal with the first reference voltage Vref1, integrates the value and outputs an integrated voltage Vamp as illustrated in FIG. 2C.

The second operational amplifier OP5 in the overcurrent detector 50 receives the integrated voltage Vamp outputted from the integrator 40 through the inverting input terminal, compares the integrated voltage Vamp with the second reference voltage Vref2, and outputs a reset signal RS to the micro-controller 10 as illustrated in FIG. 2D when the integrated voltage Vamp is less than the second reference voltage Vref2.

The micro-controller 10 receives the reset signal through the reset terminal R and outputs a signal for turning OFF the motor M when the reset signal is outputted from the second operational amplifier OP5 of the overcurrent detector 50.

Referring to FIG. 2B, when early starting power OS is applied, temporary overcurrent SS1 is caused by the early operation of the motor. At this time, if the motor voltage Vs is compared with the first reference voltage Vref1, the motor voltage Vs sensed at this time is greater than the first reference voltage Vref1. However, the motor should not be stopped by detecting such an overcurrent.

Accordingly, referring to FIG. 2C, the integrated voltage Vamp which is the integrated value of the motor voltage Vs is compared with the second reference voltage Vref2.

The micro-controller 10 does not output the reset signal RS for stopping the operation of the motor since the micro-controller 10 determines that the value of the overcurrent amount is not so much as to harm the motor although the overcurrent is caused by the early starting in the above-mentioned comparing operation.

A temporary constraint can be caused when the motor is being driven, and the temporary overcurrent SS2 is also caused in this case.

However, this case is not a situation that the operation of the motor should be stopped even though the motor voltage Vs is greater than the first reference voltage Vref1.

Accordingly, the reset signal RS is not outputted from the operational amplifier OP5 since the second reference voltage Vref2 is greater than the integrated voltage Vamp when the integrated voltage Vamp is obtained and this value is compared with the second reference value Vref2.

Overcurrent SS3, although small, can result because friction between a mechanical device and the motor is increased over a period of time. Again, this case is not the situation requiring that the operation of the motor should be stopped since the value of the overcurrent amount is not so much as to harm the motor.

Accordingly, the reset signal RS is not outputted since the second reference voltage Vref2 is greater than the integrated voltage Vamp when the integrated voltage Vamp is obtained and this value is compared with the second reference value Vref2.

However, when the operation of the motor connected to the mechanical device is finished, broken down or restrained and this results in an overcurrent SS4, the motor voltage Vs is greater than the first reference voltage Vref1 and the value of the integrated voltage Vamp is greater than that of the second reference voltage Vref2. Therefore, the operational amplifier 50 outputs the reset signal RS. The micro-controller 10 receives the reset signal RS and outputs a signal for stopping the motor M.

That is, the temporary overcurrent SS1 by the early starting, the temporary overcurrent SS2 caused during operation and the small overcurrent SS3 resulting from the increase of the mechanical friction are all distinguished from the overcurrent SS4 resulting from an actual constraint of the motor, and are processed in a manner different from the overcurrent SS4.

However, the above-mentioned conventional method has a disadvantage in that the operation of the motor has a different aspect from that at room temperature according to the coefficient of friction or thermal expansion when the environment in which the motor is operated is severe, that is, when the temperature is too high or low.

Generally, the operation current value of the motor becomes greater when the temperature is low, and the motor voltage Vs becomes also greater. Hence, the motor voltage Vs becomes greater than that of the first reference voltage Vref1 despite the fact that this is a normal operation, and such causes a malfunction occur.

SUMMARY OF THE INVENTION

An object of the present invention is to overcome the problems and disadvantages of the prior art by providing a temperature-compensating overcurrent detection circuit for a DC motor which does not respond with an early forcible operation when it is initially constrained by a mechanical device. Such device is adapted to permit the motor to carry out its operation accurately without malfunctions due to noise and temporary overcurrent while using a capacitor of small capacitance. The circuit is adapted to cope with the large overcurrent due to the actual constraint of a motor at a rapid speed by exactly distinguishing the temporary overcurrent due to power demands at startup and in the early starting stages of a motor. The circuit is capable of distinguishing both the temporary overcurrent produced while a DC motor is being operated and the weak overcurrent due to an increase in the amount of mechanical friction from the overcurrent produced by the actual constraint of the motor regardless of the operation temperature of the DC motor by accurately detecting and interpreting the overcurrent flowing in the DC motor.

To achieve the objects and in accordance with the purpose of the invention, as embodied and broadly described herein, a temperature-compensating overcurrent detection circuit for DC motor comprises a converter adapted to compensate for a current signal flowing in a motor at different operational temperatures by converting the observed voltage to a corresponding voltage signal adjusted to account for the operational temperature;

an integrator for comparing a signal inputted from the converter with the reference voltage, detecting the overcurrent and integrating the detected value; and an overcurrent detector for comparing a signal inputted from the integrator with the reference voltage, determining that overcurrent flows when the signal inputted from the integrator is greater than the reference voltage, and outputting a corresponding signal.

According to another aspect of the present invention, a temperature-compensating overcurrent detection circuit for a DC motor comprises:

a converter for converting a value of a current signal flowing in a motor into voltage;

an integrator for compensating for a signal inputted from the converter by adjusting the signal according to an operating temperature, comparing the signal with the reference voltage, and detecting overcurrent and integrating the value; and an overcurrent detector for comparing a signal inputted from the integrator with the reference voltage and determining that overcurrent flows when the signal inputted form the integrator is greater than the reference voltage.

According to another aspect of the present invention, a temperature-compensating overcurrent detection circuit for a DC motor comprises:

a converter for converting a value of a current signal flowing in a motor into voltage;

an integrator for compensating for a signal inputted from the converter by adjusting the signal according to an operating temperature, comparing the signal with the reference voltage, detecting overcurrent and integrating the value; and an overcurrent detector for comparing a signal inputted from the integrator with the reference voltage and determining that overcurrent flows when the signal inputted form the integrator is greater than the reference voltage.

Additional objects and advantages of the invention will be set forth in part in the description which follows, and will be clear from the description. The objects and advantages of the invention will be realized and attained by means of the elements and combinations particularly pointed out in the appended claims.

BRIEF DESCRIPTION OF THE DRAWINGS

FIGS. 5A to 5D are waveform charts illustrating current or voltage levels at different nodes in FIG. 4.

DESCRIPTION OF THE PREFERRED EMBODIMENTS

The accompanying drawings illustrate embodiments of the invention and, together with the description below, serve to explain the principles of the invention.

Reference will now be made in detail to the preferred embodiments of the present invention, examples of which are illustrated in the accompanying drawings. Wherever possible, the same reference numbers will be used throughout the drawings to refer to the same or like parts.

Figure 1:
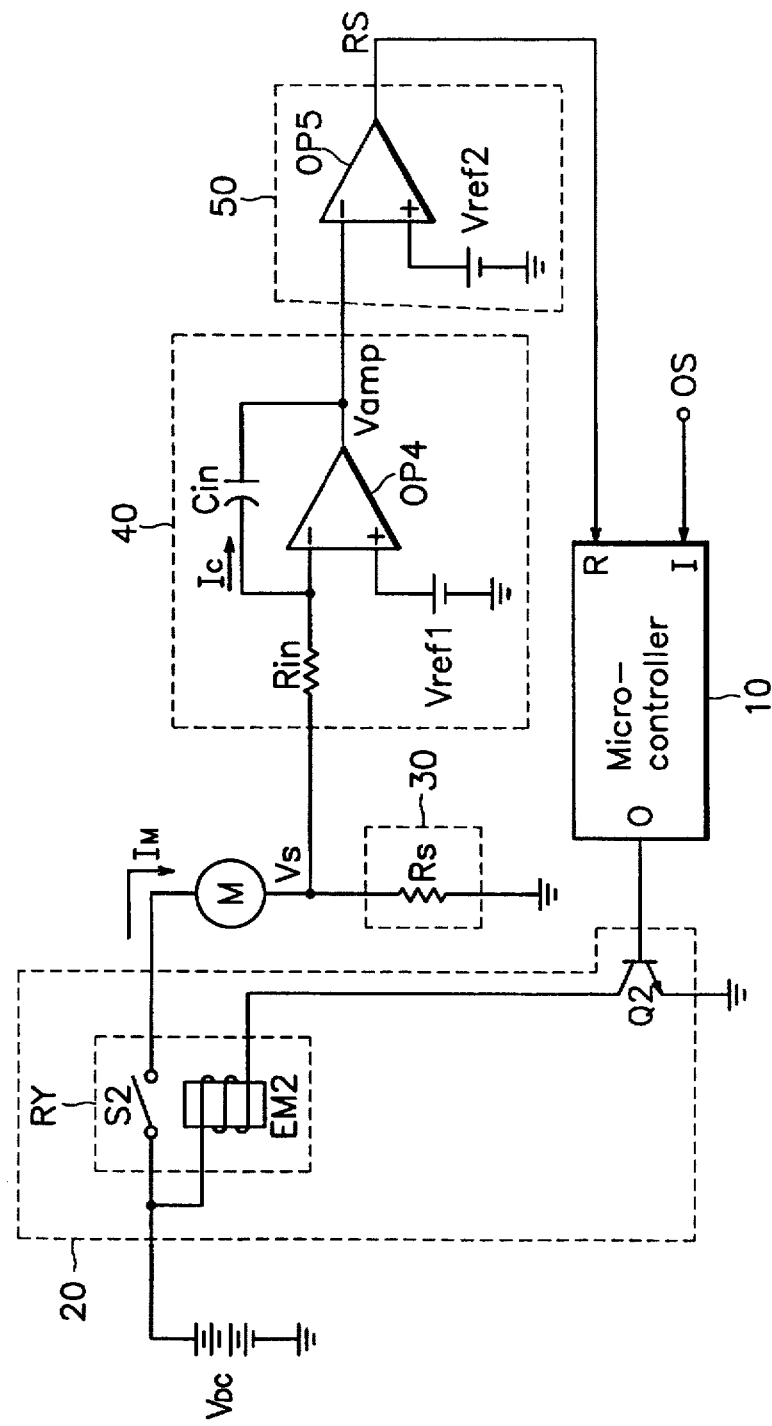
FIG. 1 is a circuit diagram illustrating a conventional overcurrent detection circuit for a DC motor.
Figure 2A:
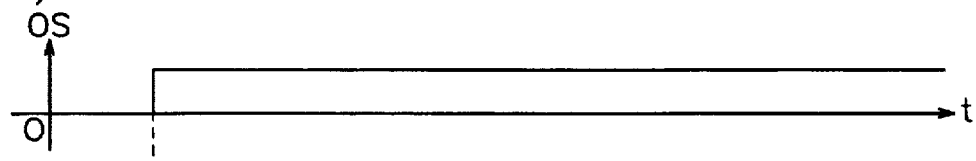
FIGS. 2A to 2D are waveform charts illustrating current or voltage levels at different nodes in FIG. 1.
Figure 2B:
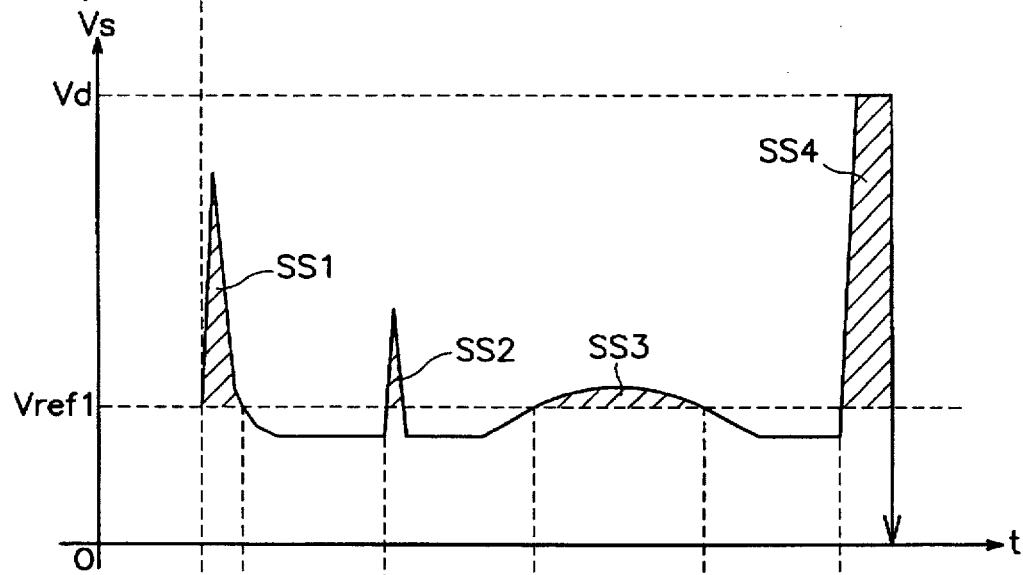
Figure 2C:
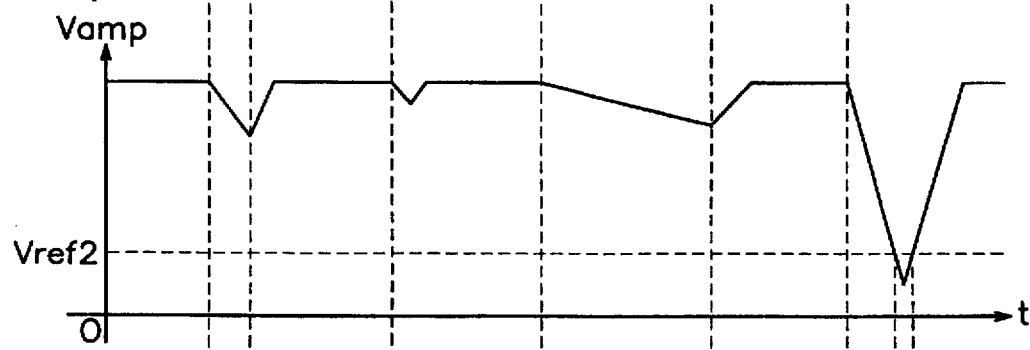
Figure 2D:
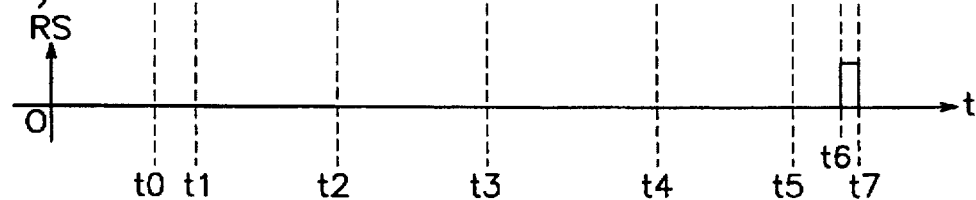
Figure 3:
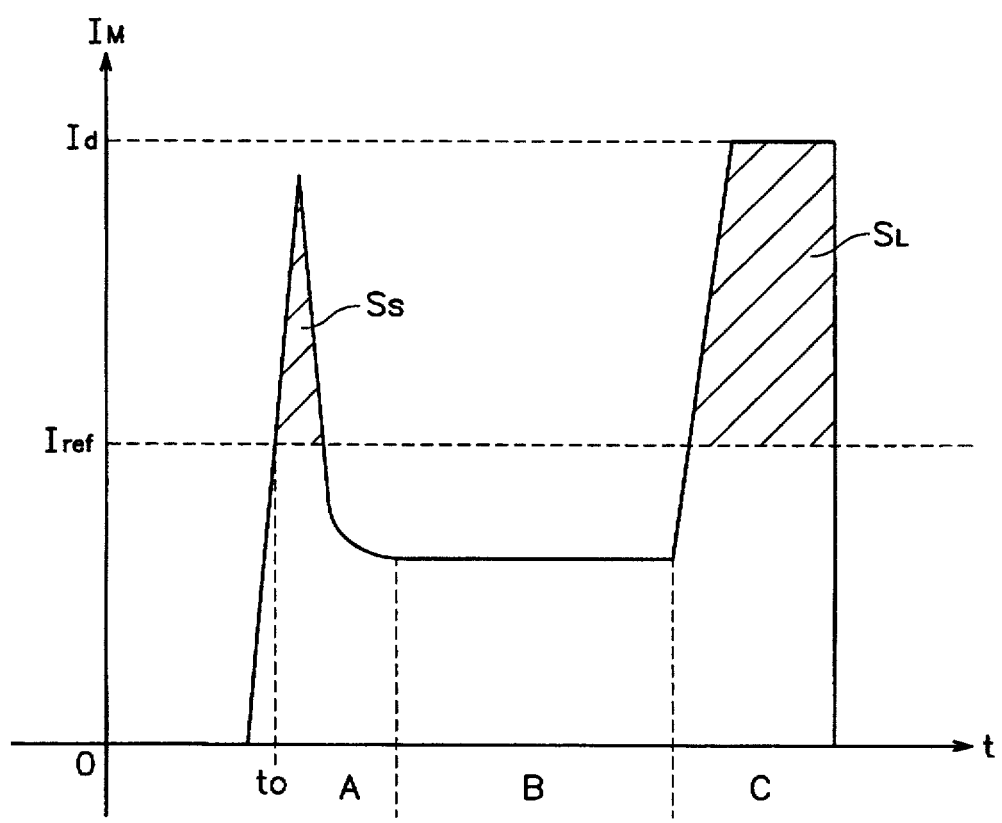
FIG. 3 is a current waveform chart illustrating the current levels during the operation of a conventional DC motor.
Figure 4:
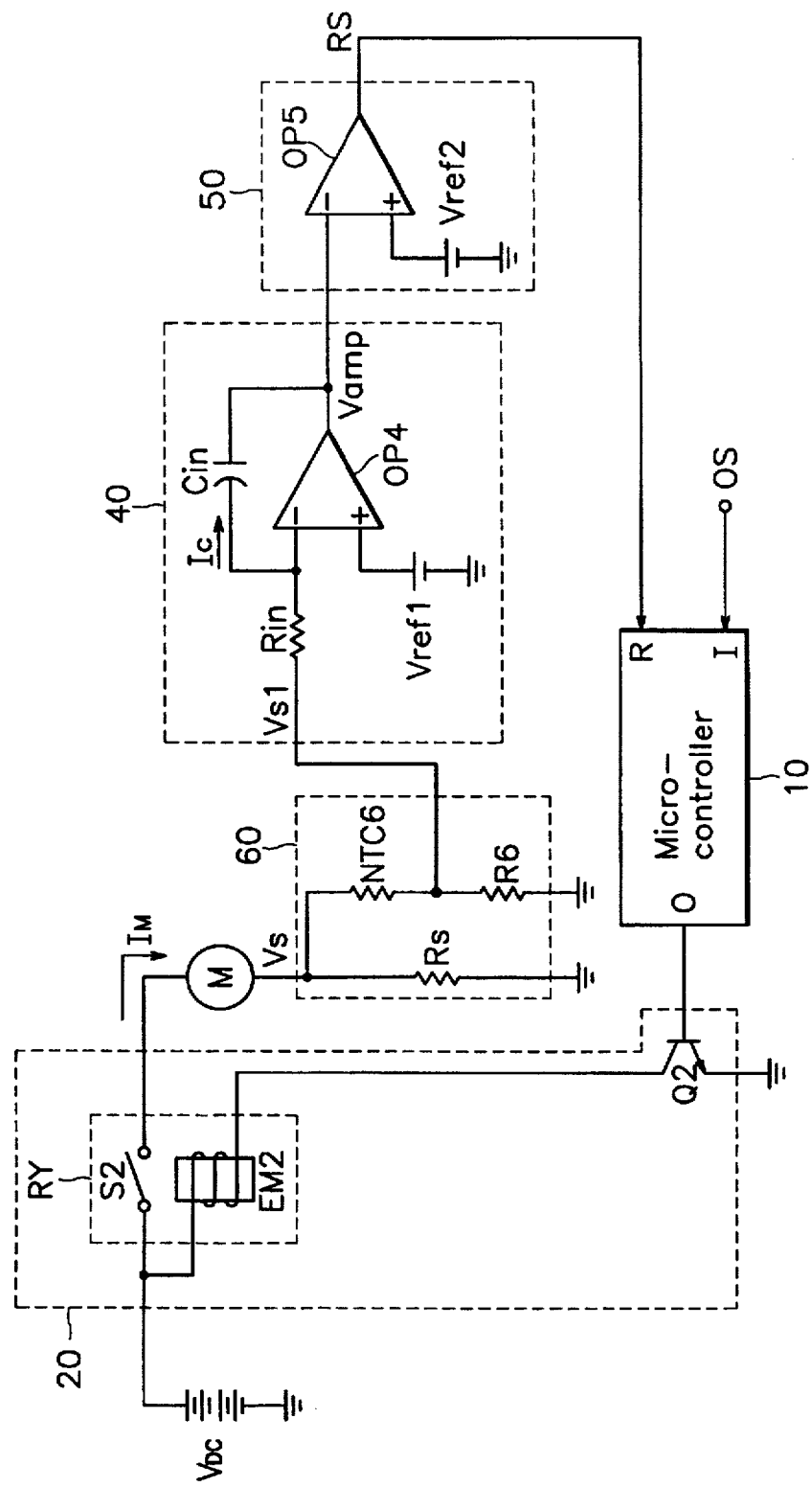
FIG. 4 is a circuit diagram illustrating a temperature-compensating overcurrent detection circuit for a DC motor according to a first preferred embodiment of the present invention.

Referring to FIG. 4, a temperature-compensating overcurrent detection circuit for a DC motor according to a first preferred embodiment of the present invention comprises a micro-controller 10 for receiving signals from a signal input terminal I for driving a motor and a reset terminal R for receiving a reset signal, and outputting a signal for controlling the motor through a signal output terminal O; a motor driver 20 operated according to a signal outputted from the micro-controller 10 and for outputting a signal for driving the motor; a motor M connected to an output terminal of the motor driver 20 and driven according to a signal inputted from the motor driver 20; a converter 60 for compensating for a current signal flowing in the motor M by adjusting the current signal according to an operation temperature and converting it to a corresponding voltage signal; an integrator 40 for comparing a signal inputted from the converter 60 with the reference voltage, detecting overcurrent and integrating the detected value; and an overcurrent detector 50 for comparing a signal inputted from the integrator 40 with the reference voltage, determining that overcurrent flows when the signal inputted from the integrator 40 is greater than the reference voltage, and outputting a corresponding signal.

The motor driver 20 includes a transistor Q2 with a base terminal connected to the output terminal O of the micro-controller 10 and with an emitter terminal grounded, and a relay RY with a first terminal whereto a power $V_{DC}$ is connected and with a signal input terminal connected to a collector terminal of the transistor Q2.

The relay RY includes an electromagnet EM2 with a first terminal whereto the power $V_{DC}$ is connected and a second terminal which is connected to the collector terminal of the transistor Q2, and a switch S2 with a first terminal connected to a first terminal of the electromagnet EM2 and with a second terminal connected to a first terminal of the motor M.

The converter 60 includes a resistor Rs with a first terminal connected to the second terminal of the motor M and having its second terminal grounded; a thermistor NTC6 with a first terminal connected to a first terminal of the resistor Rs; and a resistor R6 with a first terminal connected to the second terminal of the thermistor NTC6 and having its second terminal grounded.

The integrator 40 includes an input resistor Rin with a first terminal connected to the second terminal of the thermistor NTC6 in the converter 60; a first operational amplifier OP4 with an inverting input terminal connected to the second terminal of the input resistor Rin and with a non-inverting input terminal whereto a first reference voltage Vref1 is inputted; and a capacitor Cin with a first terminal connected to the second terminal of the input resistor Rin and having a second terminal connected to an output terminal of the first operational amplifier OP4.

The overcurrent detector 50 includes a second operational amplifier OP5 with an inverting input terminal whereto an output signal of the first operational amplifier OP4 in the integrator 40 and a non-inverting input terminal whereto a second reference voltage Vref2 is inputted.

The operation of the temperature-compensating overcurrent detection circuit for a DC motor according to the first preferred embodiment of the present invention will be explained with reference to the accompanying drawings hereinafter.

When a driving signal OS as illustrated in FIG. 5A is inputted to a signal input terminal I in the micro-controller 10, the micro-controller 10 outputs a signal to the motor driver 20 thereby turning ON the transistor Q2. Accordingly, the relay RY is turned ON, the switch S2 is closed, the motor driving power $V_{DC}$ is supplied to the motor M, and the motor M is driven.

Motor current $I_M$ flows when the motor M is driven, motor voltage Vs in the other terminal of the motor M is formed by the resistor Rs in the converter 60, and a waveform, 'AA' is detected at room temperature as illustrated in FIG. 5B.

The motor voltage Vs is divided by a resistance value of the thermistor NTC6 and the resistor R6, and a modified motor voltage Vs1 is obtained.

The thermistor NTC6 is a negative temperature coefficient thermistor and has an element for which the resistance value is greatly reduced when the temperature rises.

The integrator 40 receives the modified motor voltage Vs1 through the input resistor Rin, which then flows on into the inverting input terminal.

Here, since the value of the input resistor Rin is much greater than those of the resistor Rs, the thermistor NTC6 and the resistor R6, it does not influence the signal value of the modified motor voltage Vs1.

The first operational amplifier OP4 in the signal integrator 40 compares the inputted signal with the first reference voltage Vref1, integrates the value and outputs the integrated voltage Vamp as illustrated in FIG. 5C.

The overcurrent detector 50 receives the integrated voltage Vamp outputted from the integrator 40 through the inverting input terminal, compares the integrate voltage Vamp with the second reference voltage Vref2, and outputs a reset signal RS to the micro-controller 10 as illustrated in FIG. 5D when the integrated voltage Vamp is less than the second reference voltage Vref2.

The micro-controller 10 receives the reset signal through the reset terminal R and outputs a signal for turning OFF the motor M when the reset signal is produced from the overcurrent detector 50.

Referring to FIG. 5B, when an early starting power OS is applied, the early operation of the motor results in the temporary overcurrent SS1. At this time, if the modified motor voltage Vs1 is compared with the first reference voltage Vref1, the modified motor voltage Vs1 sensed at this time is greater than the first reference voltage Vref1. However, the circuit detector should distinguish such a condition and not react by stopping the motor when such an overcurrent is detected.

Accordingly, referring to FIG. 5C, the integrated voltage Vamp which is the integrated value of the modified motor voltage Vs1 is compared with the second reference voltage Vref2.

The micro-controller 10 does not output the reset signal RS for stopping the operation of the motor since the micro-controller 10 determines that the value of the overcurrent amount is not so much as to harm the motor although the overcurrent is detected which is caused by the early starting in the above-mentioned comparing operation.

A temporary constraint can be caused when the motor is being driven, and the temporary overcurrent SS2 is also caused in such a case.

However, this case is also situation that does not require that the operation of the motor should be stopped even though the modified motor voltage Vs1 is greater than the first reference voltage Vref1.

Accordingly, the reset signal RS is not outputted since the second reference voltage Vref2 is greater than the integrated voltage Vamp when the integrated voltage Vamp is obtained and this value is compared with the second reference value Vref2.

Overcurrent SS3 can result, although small, because friction between a mechanical device and the motor becomes increased over a period of time. And such a case is also not a situation that requires the operation of the motor to be stopped since the value of the overcurrent amount is not so high as to harm the motor.

Accordingly, the reset signal RS is not outputted since the second reference voltage Vref2 is greater than the integrated voltage Vamp when the integrated voltage Vamp is obtained and this value is compared with the second reference value Vref2.

However, when the operation of the motor connected to the mechanical device is finished, broken down or restrained and results in overcurrent SS4, the modified motor voltage Vs1 is greater than the first reference voltage Vref1 and the value of the integrated voltage Vamp is greater than that of the second reference voltage Vref2. In such a case the operational amplifier 50 is adapted to output the reset signal RS. The micro-controller 10 receives the reset signal RS and outputs a signal for stopping the motor M.

In the meantime, when the operation temperature of the motor M rises, the operation current of the motor M becomes small, accordingly, the motor voltage Vs becomes small at room temperature. If the temperature rises, the resistance value of the thermistor NTC6 is reduced accordingly to the increase in temperature whereby the modified motor voltage Vs1 has substantially the same value as that which would have been observed at room temperature.

Accordingly, since the signal inputted to the integrator 40 is the same as that which would be observed at room temperature even though the operation temperature of the motor M rises, detection of that overcurrent does not cause a malfunction of the motor to occur.

When the operation temperature of the motor M falls, the operation current of the motor M increases. Accordingly, the motor voltage Vs is greater than that in the room temperature as illustrated in 'BB' of FIG. 5B. When the temperature falls, the resistance value of the thermistor NTC6 is increased proportional to the fallen temperature and the modified motor voltage Vs1 has substantially the same value as would have been observed at room temperature.

Accordingly, since the signal inputted to the integrator 40 is substantially the same as that which would have been observed at room temperature even though the operation temperature of the motor M falls, a malfunction of the motor does not occur which is caused by the detection of such overcurrent.

As described above, the motor M can be protected from the overcurrent since the temporary overcurrent SS1 caused by the early starting loads, the temporary overcurrent SS2 caused during the operation and the small overcurrent SS3 by the increase of the mechanical friction are distinguished from the overcurrent SS4, SS5 and SS6 resulting from an actual constraint of the motor, and are processed differently even though the operation temperature of the motor M has changed.

Hereinafter, a second preferred embodiment of the present invention will be described with reference to the accompanying drawings.

Figure 6:
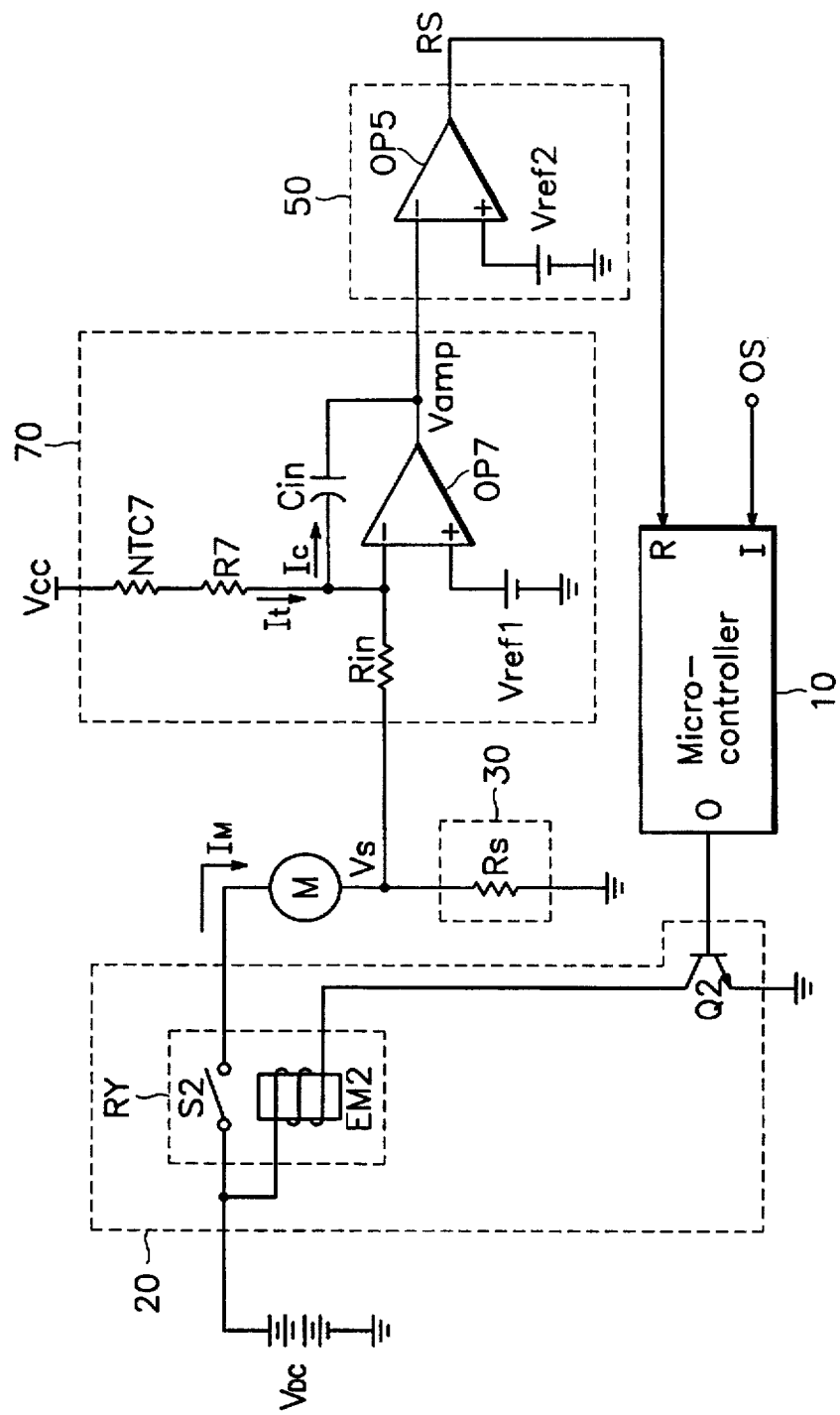
FIG. 6 a circuit diagram illustrating a temperature-compensating overcurrent detection circuit for a DC motor according to a second preferred embodiment of the present invention.

Referring to FIG. 6, a temperature-compensating overcurrent detection circuit for a DC motor according to the second preferred embodiment of the present invention comprises a micro-controller 10 for receiving signals from a signal input terminal I for driving a motor and a reset terminal R for receiving a reset signal, and outputting a signal for controlling the motor through a signal output terminal O; a motor driver 20 operated according to a signal outputted from the micro-controller 10 and for outputting a signal for driving the motor; a motor M connected to an output terminal of the motor driver 20 and driven according to a signal inputted from the motor driver 20; a converter 30 for compensating a current signal flowing in the motor M and adjusting the signal according to an operation temperature and converting the adjusted signal to a corresponding voltage signal; an integrator 70 for comparing a signal inputted from the converter 30 with the reference voltage, detecting overcurrent and integrating the detected value; and an overcurrent detector 50 for comparing a signal inputted from the integrator 40 with the reference voltage, determining that overcurrent flows when the signal inputted from the integrator 70 is greater than the reference voltage, and outputting a corresponding signal.

The motor driver 20 and the overcurrent detector 50 have the same construction as those in the first preferred embodiment of the present invention, and so the description of the motor driver 20 and the overcurrent detector 50 will be omitted.

The converter 30 includes a resistor Rs with a first terminal connected to the second terminal of the motor M and having its second terminal grounded.

The integrator 70 includes an input resistor Rin with a first terminal connected to first terminal of the resistor Rs in the converter 30; a thermistor NTC7 with a first terminal whereto a driving power Vcc is connected; a resistor R7 with a first terminal connected to the second terminal of the thermistor NTC7 and having a second terminal connected to the second terminal of the input and the resistor Rin; a first operational amplifier OP7 with an inverting input terminal connected to the second terminal of the input resistor Rin with and a non-inverting input terminal whereto a first reference voltage Vref1 is inputted; and a capacitor with a first terminal connected to the second terminal of the input resistor Rin and having a second terminal connected to an output terminal of the first operational amplifier OP7.

The operation of the temperature-compensating overcurrent detection circuit for a DC motor according to the second preferred embodiment of the present invention will be explained with reference to the accompanying drawings hereinafter.

When a driving signal OS as illustrated in FIG. 5A is inputted to a signal input terminal I in the micro-controller 10, the micro-controller 10 outputs a signal to the motor driver 20 thereby turning ON the transistor Q2. Accordingly, the relay RY is turned ON, the switch S2 is closed, the motor driving power $V_{DC}$ is supplied to the motor M, and the motor M is driven.

Motor current $I_M$ flows when the motor M is driven, motor voltage Vs in the second terminal of the motor M is formed by the resistor Rs in the converter 30, and a waveform, 'AA' is detected at room temperature as illustrated in FIG. 5B.

The integrator 70 receives the modified motor voltage Vs1 through the input resistor Rin which continues on into the inverting input terminal.

Here, since the value of the input resistor Rin is much greater than those of the resistor Rs, the thermistor NTC7 and the resistor R7, it does not influence the signal value of the modified motor voltage Vs1.

The first operational amplifier OP7 in the signal integrator 70 compares the inputted signal with the first reference voltage Vref1, integrates the value and outputs integrated voltage Vamp as illustrated in FIG. 5C.

The integrated voltage Vamp is influenced by the capacitor current Ic, and the capacitor current Ic is determined by the compensating current It according to the resistance values of the thermistor NTC7 and the resistor R7.

That is, the integrated voltage Vamp is determined by the motor voltage Vs and the thermistor NTC7.

The thermistor NTC7 is a negative temperature coefficient thermistor as in the first preferred embodiment of the present invention and has element for which the resistance value is greatly reduced when the temperature rises.

The overcurrent detector 50 receives the integrated voltage Vamp outputted from the integrator 70 through the inverting input terminal, compares the integrated voltage Vamp with the second reference voltage Vref2, and outputs a reset signal RS to the micro-controller 10 as illustrated in FIG. 5D when the integrated voltage Vamp is less than the second reference voltage Vref2.

The micro-controller 10 receives the reset signal through the reset terminal R and outputs a signal for turning OFF the motor M when the reset signal is outputted from the overcurrent detector 50.

Referring to FIG. 5B, when an early starting power OS is applied, a temporary overcurrent SS1 is caused by the load resulting from the early operation of the motor. At this time, if the modified motor voltage Vs1 is compared with the first reference voltage Vref1, the modified motor voltage Vs1 sensed at this time is greater than the first reference voltage Vref1. However, such a situation should be detected and the motor should not be stopped by the detection of the presence of such an overcurrent.

Accordingly, referring to FIG. 5C, the integrated voltage Vamp which is the integrated value of the modified motor voltage Vs1 is compared with the second reference voltage Vref2. The micro-controller 10 does not output the reset signal RS for stopping the operation of the motor since the micro-controller 10 determines that the value of the overcurrent amount is not so much as to harm the motor although it detects the overcurrent which is caused by the early starting in the above-mentioned comparing operation.

A temporary constraint can be caused when the motor is being driven, and the temporary overcurrent SS2 is also caused in this case.

However, this case is not a situation that the operation of the motor should be stopped even though it is observed that the modified motor voltage Vs1 is greater than the first reference voltage Vref1.

Accordingly, the reset signal RS is not outputted since the second reference voltage Vref2 is greater than the integrated voltage Vamp when the integrated voltage Vamp is obtained and this value is compared with the second reference value Vref2.

Overcurrent SS3, although small, can result because of friction between a mechanical device and the motor which becomes increased over a period of time. And this case is not the situation that the operation of the motor should be stopped since the value of the overcurrent amount is not so much as to harm the motor.

Accordingly, the reset signal RS is not outputted since the second reference voltage Vref2 is greater than the integrated voltage Vamp when the integrated voltage Vamp is obtained and this value is compared with the second reference value Vref2.

However, when the operation of the motor connected to the mechanical device is finished, broken down or restrained and results in overcurrent SS4, the motor voltage Vs is greater than the first reference voltage Vref1 and the value of the integrated voltage Vamp is greater than that of the second reference voltage Vref2. Upon such a detection the operational amplifier 50 outputs the reset signal RS. The micro-controller 10 receives the reset signal RS and outputs a signal for stopping the motor M.

In the meantime, when the operation temperature of the motor M rises, the operation current of the motor M becomes small, accordingly, the motor voltage Vs becomes smaller at room temperature. If the temperature rises, the resistance value of the thermistor NTC7 in the integrator 70 is reduced in proportion to the increase in the temperature whereby it is adapted to compensate for such conditions an adjust the current signal accordingly. If the temperature value drops the resistance value is increased. Accordingly, capacitor current Ic is increased and the integrated voltage Vamp is increased to the same value as would have been observed at room temperature.

Accordingly, since the size of the integrated voltage Vamp outputted from the integrator 70 is the same as that which would have been observed at room temperature even though the operation temperature of the motor M rises, a malfunction of the motor does not occur as a result of the detection of that overcurrent.

When the operation temperature of the motor M falls, the operation current of the motor M increases. Accordingly, the motor voltage Vs is greater than that in the room temperature. When the temperature falls, the resistance value of the thermistor NTC7 in the integrator 70 is increased in proportion to the fallen temperature, whereby the compensating current is reduced. Accordingly, the capacitor current Ic is reduced and the integrated voltage Vamp is reduced to the same value as that at room temperature.

Accordingly, since the value of the integrated voltage Vamp outputted from the integrator 70 is the same as that which would have been observed at room temperature even though the operation temperature of the motor M falls, a malfunction of the motor does not occur as a result of detecting that overcurrent.

As described above, the motor M can be protected from overcurrent due to actual constraints of the motor, since the temporary overcurrent SS1 by the early starting, the temporary overcurrent SS2 caused during the operation and the small overcurrent SS3 by the increase of the mechanical friction are distinguished from the overcurrent SS4, SS5 and SS6 caused by actual constraint of the motor. Such overcurrent detections are distinguished from one another and processed separately even though the operation temperature of the motor M has changed.

Hereinafter, a third preferred embodiment of the present invention will be described with reference to the accompanying drawings.

Figure 7:
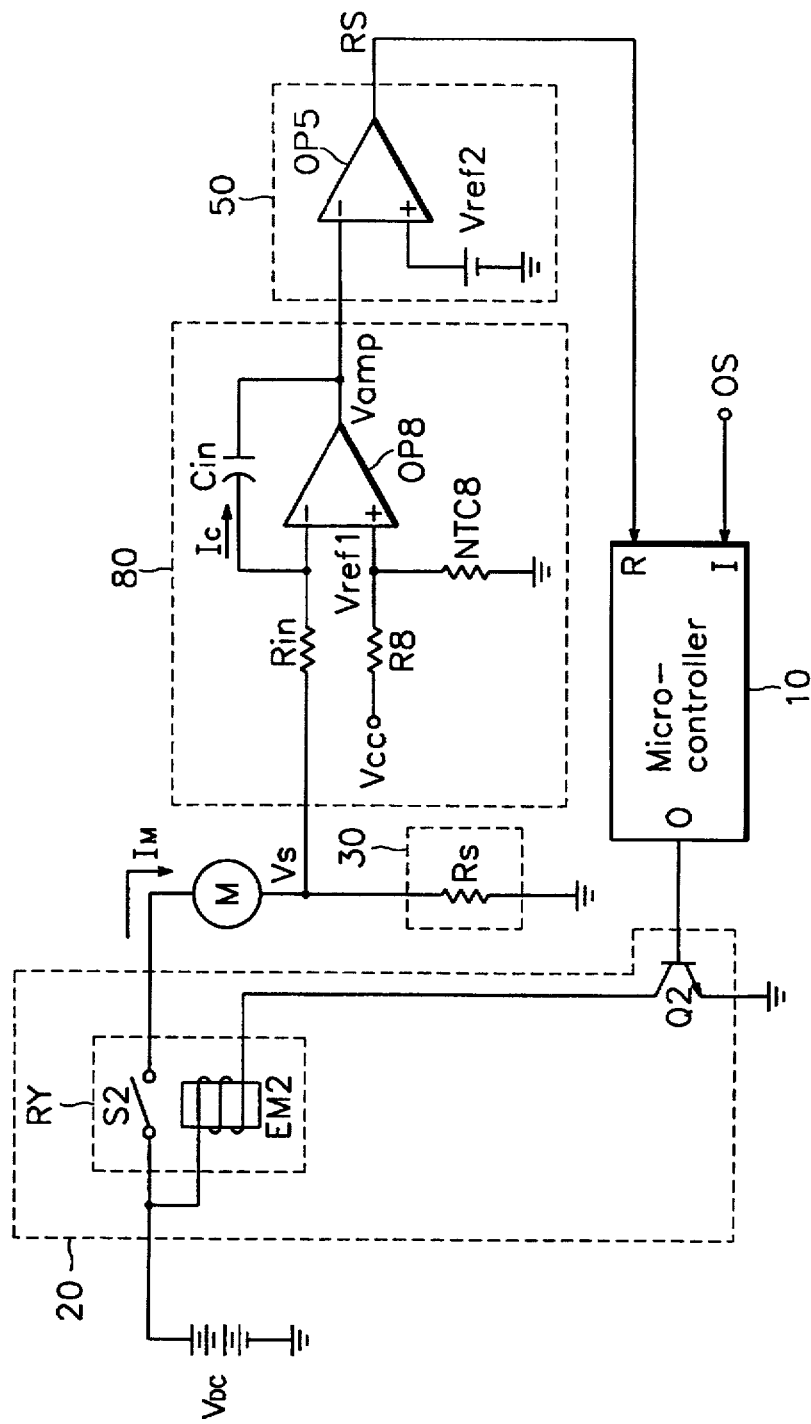
FIG. 7 is a circuit diagram illustrating a temperature-compensating overcurrent detection circuit for a DC motor according to a third preferred embodiment of the present invention.

Referring to FIG. 7, a temperature-compensating overcurrent detection circuit for a DC motor according to the third preferred embodiment of the present invention comprises a micro-controller 10 for receiving signals from a signal input terminal I for driving a motor and a reset terminal R for receiving a reset signal, and outputting a signal for controlling the motor through a signal output terminal O; a motor driver 20 operated according to a signal outputted from the micro-controller 10 and for outputting a signal for driving the motor; a motor M connected to an output terminal of the motor driver 20 and driven according to a signal inputted from the motor driver 20; a converter 30 for compensating for a current signal flowing in the motor M according to an operation temperature by adjusting the observed signal according to the temperature and converting the signal to a corresponding voltage signal; an integrator 80 for comparing a signal inputted from the converter 30 with the reference voltage, detecting overcurrent and integrating the detected value; and an overcurrent detector 50 for comparing a signal inputted from the integrator 80 with the reference voltage, determining that overcurrent flows when the signal inputted from the integrator 80 is greater than the reference voltage, and outputting a corresponding signal.

The motor driver 20 and the overcurrent detector 50 have the same construction as those in the first preferred embodiment of the present invention, and so the description of the motor driver 20 and the overcurrent detector 50 will be omitted.

The converter 30 has the same construction as that in the second preferred embodiment of the present invention, and so the description of the converter 30 will be also omitted.

The integrator 80 includes an input resistor Rin with a first terminal connected to a first terminal of the resistor Rs in the converter 30; a resistor R8 with a first terminal whereto a driving power Vcc is connected; a thermistor NTC8 with a first terminal connected to the second terminal of the resistor R8 and having a second terminal which is grounded; a first operational amplifier OP7 with an inverting input terminal connected to the other terminal of the input resistor Rin and with a non-inverting input terminal connected to a first terminal of the thermistor NTC8; and a capacitor with a first terminal connected to the second terminal of the input resistor Rin and having a second terminal connected to an output terminal of the first operational amplifier OP8.

The operation of the temperature-compensating overcurrent detection circuit for a DC motor according to the third preferred embodiment of the present invention will be explained with reference to the accompanying drawings hereinafter.

When a driving signal OS as illustrated in FIG. 5A is inputted to a signal input terminal I in the micro-controller 10, the micro-controller 10 outputs a signal to the motor driver 20 thereby turning ON the transistor Q2. Accordingly, the relay RY is turned ON, the switch S2 is closed, the motor driving power $V_{DC}$ is supplied to the motor M, and the motor M is driven.

Motor current $I_M$ flows when the motor M is driven, motor voltage Vs in the other terminal of the motor M is formed by the resistor Rs in the converter 30, and a waveform, 'AA' is detected at room temperature as illustrated in FIG. 5B.

The integrator 80 receives the modified motor voltage Vs1 through the input resistor Rin and into the inverting input terminal.

Here, since the value of the input resistor Rin is much greater than those of the resistor Rs, the thermistor NTC8 and the resistor R8, it does not influence the signal value of the modified motor voltage Vs1.

The first operational amplifier OP8 in the signal integrator 80 compares the inputted signal with the first reference voltage Vref1, integrates the value and outputs the integrated voltage Vamp as illustrated in FIG. 5C.

The first reference voltage Vref1 is determined by the resistance values of the resistor R8 and the thermistor NTC8, and the thermistor NTC8 is a negative temperature coefficient thermistor as in the first preferred embodiment of the present invention has an element for which the resistance value is greatly reduced when the temperature rises.

That is, the integrated voltage Vamp is determined by the motor voltage Vs and the resistance value of thermistor NTC8.

The overcurrent detector 50 receives the integrated voltage Vamp outputted from the integrator 80 through the inverting input terminal, compares the integrated voltage Vamp with the second reference voltage Vref2, and outputs a reset signal RS to the micro-controller 10 as illustrated in FIG. 5D when the integrated voltage Vamp is less than the second reference voltage Vref2.

The micro-controller 10 receives the reset signal through the reset terminal R and outputs a signal for turning OFF the motor M when the reset signal is outputted from the overcurrent detector 50.

Referring to FIG. 5B, when an early starting power OS is applied, temporary overcurrent SS1 is caused by the early operation of the motor. At this time, if the modified motor voltage Vs1 is compared with the first reference voltage Vref1, the modified motor voltage Vs1 sensed at this time is greater than the first reference voltage Vref1. However, detect and distinguish such a situation with the result that the motor should not be stopped by observing such an overcurrent.

Accordingly, referring to FIG. 5C, the integrated voltage Vamp which is the integrated value of the modified motor voltage Vs1 is compared with the second reference voltage Vref2.

The micro-controller 10 does not output the reset signal RS for stopping the operation of the motor since the micro-controller 10 determines that the value of the overcurrent amount is not so much as to break the motor although the overcurrent is caused by the early starting in the abovementioned comparing operation.

A temporary constraint can be caused when the motor is being driven, and the temporary overcurrent SS2 is also caused in this case.

However, this case is also not a situation that the should result in the operation of the motor being stopped even though the modified motor voltage Vs1 is observed to be greater than the first reference voltage Vref1.

Accordingly, the reset signal RS is not outputted since the second reference voltage Vref2 is greater than the integrated voltage Vamp when the integrated voltage Vamp is obtained and this value is compared with the second reference value Vref2.

Overcurrent SS3, although small, can result because friction between a mechanical device and the motor is increased over a period of time. Again, this case is not a situation which necessitates stopping the operation of the motor since the value of the overcurrent is not so high as to damage the motor.

Accordingly, the reset signal RS is not outputted since the second reference voltage Vref2 is greater than the integrated voltage Vamp when the integrated voltage Vamp is obtained and this value is compared with the second reference value Vref2.

However, when the operation of the motor connected to the mechanical device is finished, broken down or constrained and results in overcurrent SS4, the motor voltage Vs is greater than the first reference voltage Vref1 and the value of the integrated voltage Vamp is greater than that of the second reference voltage Vref2. Hence, the operational amplifier 50 outputs the reset signal RS. The micro-controller 10 receives the reset signal RS and outputs a signal for stopping the motor M.

In the meantime, when the operation temperature of the motor M rises, the operation current of the motor M becomes smaller, accordingly, the motor voltage Vs becomes smaller at room temperature. If the temperature rises, the resistance value of the thermistor NTC8 in the integrator 80 is reduced proportional to the increased temperature whereby the value of the first reference voltage Vref1 is reduced proportionally to compensate for the increased temperature.

Accordingly, the value of the integrated voltage Vamp outputted from the integrator 80 is substantially the same as that which would have been observed at room temperature. As a result, even though the operational temperature of the motor M rises, a malfunction of the motor does not occur as a consequence of detecting such an overcurrent.

When the operation temperature of the motor M falls, the operation current of the motor M increases. Accordingly, the motor voltage Vs is greater than that which would have been observed at room temperature. Therefore, when the temperature falls, the resistance value of the thermistor NTC8 in the integrator 80 is increased directly proportional to the fallen temperature, whereby the value of the first reference voltage Vref1 is increased by an amount proportional to the change in temperature.

Accordingly, the signal inputted to the integrator 80 is substantially the same as that which would have been observed at room temperature. Hence, even though the operation temperature of the motor M falls, a malfunction of the motor does not result from the detection of that overcurrent.

As described above, the motor M can be protected from the overcurrent since the current detector is adapted to distinguish the temporary overcurrent SS1 caused the early starting, the temporary overcurrent SS2 caused during operation and the small overcurrent SS3 by the increase of the mechanical friction from the overcurrent SS4, SS5 and SS6 that are caused by actual constraint of the motor. Such overcurrent detections are processed differently even though the operational temperature of the motor M has changed.

Accordingly, the effect of the present invention lies in that the temperature-compensating overcurrent detection circuit for a DC motor does not respond with an early forcible operation when the mechanical device is constrained. Such a detection circuit allows the motor to carry out its operation properly without having malfunctions due to noise and the temporary overcurrent. The circuit utilizes a capacitor of small capacitance, and can cope with the large overcurrent due to the actual constraint of the motor at a rapid speed by clearly distinguishing the temporary overcurrent SS1 due to the early starting, the temporary overcurrent SS2 outputted even if the DC motor is being operated and the weak overcurrent SS3 due to the increase of the mechanical friction from the overcurrent SS4 outputted by the actual constraint of the motor regardless of the temperature at which the DC motor is operated in detecting the overcurrent flowing in the DC motor.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A temperature-compensating overcurrent detection circuit for a DC motor, comprising:

a converter for compensating a current signal flowing in a motor, adapted to adjust the signal by an amount proportional to an operation temperature of the motor and converting the adjusted signal to a corresponding voltage signal;

an integrator for comparing the voltage signal inputted from the converter with a first reference voltage, detecting overcurrent and integrating the detected value; and an overcurrent detector for comparing the integrated value inputted from the integrator with a second reference voltage, determining that overcurrent flows when the integrated value from the integrator is greater than the second reference voltage, and outputting a corresponding signal.

2. The temperature-compensating overcurrent detection circuit for DC motor of claim 1, wherein the converter comprises:

a first resistor with a first terminal connected to the motor and a second terminal is grounded;

a thermistor with a first terminal connected to the first terminal of the first resistor; and a second resistor with a first terminal connected to a second terminal of the thermistor and a second terminal is grounded.

3. The temperature-compensating overcurrent detection circuit for a DC motor of claim 2, wherein the integrator comprises:

a third resistor having a first terminal connected to the second terminal of the thermistor in the converter;

a first operational amplifier with an inverting input terminal connected to a second terminal of the third resistor and having a non-inverting input terminal whereto the first reference voltage is inputted; and a capacitor having a first terminal connected to the second terminal of the third resistor and having a second terminal connected to an output terminal of the first operational amplifier.

4. The temperature-compensating overcurrent detection circuit for a DC motor of claim 3, wherein the third resistor has a value much greater than a value of the first resistor.

5. The temperature-compensating overcurrent detection circuit for a DC motor of claim 1, wherein the overcurrent detector comprises a second operational amplifier having an inverting input terminal whereto an output signal of a first operational amplifier in the integrator is inputted and a non-inverting input terminal whereto the second reference voltage is inputted.

6. A temperature-compensating overcurrent detection circuit for a DC motor, comprising:

a converter for converting a value of a current signal flowing in a motor into a voltage signal;

an integrator adapted to compensate the voltage signal inputted from the converter in an amount proportional to an operating temperature of the motor, comparing the compensated signal with a first reference voltage, detecting overcurrent and integrating the compensated signal; and an overcurrent detector for comparing the integrated signal inputted from the integrator with a second reference voltage and determining that overcurrent flows when the integrated signal inputted the integrator is greater than the second reference voltage.

7. The temperature-compensating overcurrent detection circuit for a DC motor of claim 6, wherein the converter comprises a first resistor having a first terminal connected to the motor and a second terminal is grounded.

8. The temperature-compensating overcurrent detection circuit for a DC motor of claim 7, wherein the integrator comprises a second resistor with a first terminal connected to the first terminal of the first resistor in the converter;

a thermistor having a first terminal whereto a driving power is connected;

a third resistor having a first terminal connected to a second terminal of the thermistor and having a second terminal connected to a second terminal of the second resistor;

a first operational amplifier having an inverting input terminal connected to the second terminal of the second resistor and having a non-inverting input terminal whereto the first reference voltage is inputted; and a capacitor having a first terminal connected to the second terminal of the second resistor and having a second terminal connected to an output terminal of the first operational amplifier.

9. The temperature-compensating overcurrent detection circuit for a DC motor of claim 8, wherein the second resistor has a value much greater than a value of the first resistor.

10. The temperature-compensating overcurrent detection circuit for a DC motor of claim 6, wherein the overcurrent detector comprises a second operational amplifier having an inverting input terminal whereto an output signal of a first operational amplifier in the integrator is inputted and having a non-inverting input terminal whereto the second reference voltage is input.

11. The temperature-compensating overcurrent detection circuit for DC motor of claim 7, wherein the integrator comprises a second resistor having a first terminal connected to the first terminal of the first resistor in the converter;

a third resistor having a first terminal whereto a driving power is inputted;

a thermistor having a first terminal connected to a second terminal of the third resistor and having a second terminal which is grounded;

a first operational amplifier having an inverting input terminal connected to a second terminal of the second resistor and having a non-inverting input terminal connected to the first terminal of the thermistor; and a capacitor having a first terminal connected to the second terminal of the second resistor and having a second terminal connected to an output terminal of the first operational amplifier.

12. The temperature-compensating overcurrent detection circuit for DC motor of claim 11, wherein the second resistor has a value much greater than a value of the first resistor.

13. The temperature-compensating overcurrent detection circuit for DC motor of claim 12, wherein the overcurrent detector comprises a second operational amplifier having an inverting input terminal whereto an output signal of the first operational amplifier in the integrator is inputted and having a non-inverting input terminal whereto the second reference voltage is inputted.

* * * * *